United States Patent [19]

Clark et al.

[11] Patent Number: 4,773,936

[45] Date of Patent: Sep. 27, 1988

[54] INSOLUBLE PIGMENTS AND PREPARATION THEREOF

[75] Inventors: Howard W. Clark; Tracy E. Chapman; Ronald L. Yates, all of Midland, Mich.

[73] Assignee: The Dow Chemical Company, Midland, Mich.

[21] Appl. No.: 876,558

[22] Filed: Jun. 20, 1986

Related U.S. Application Data

[63] Continuation-in-part of Ser. No. 748,272, Jun. 24, 1985, abandoned.

[51] Int. Cl.[4] .................... C09C 1/02; C09C 3/08
[52] U.S. Cl. ........................ 106/402; 106/442; 106/445; 106/462; 106/461; 106/471; 106/463; 106/499; 106/501; 106/503; 210/683; 252/175; 252/179; 252/184; 423/463; 423/467; 423/593; 423/600
[58] Field of Search ............. 106/288, 289, 306; 423/463, 467, 593, 600; 252/175, 179, 184; 210/683

[56] References Cited

U.S. PATENT DOCUMENTS

| | | | |
|---|---|---|---|
| 2,213,641 | 9/1940 | Tainton | 252/89 |
| 2,561,695 | 7/1951 | Gustafson | 127/46 |
| 3,002,932 | 10/1961 | Duwell et al. | 252/179 |
| 3,879,525 | 4/1975 | Miyata et al. | 423/600 |
| 3,907,715 | 9/1975 | Arai et al. | 252/465 |
| 4,065,257 | 12/1977 | Coe et al. | 8/74 |
| 4,121,903 | 10/1978 | Smolka | 8/137 |
| 4,145,400 | 3/1979 | Adsetts | 423/600 |
| 4,216,084 | 8/1980 | Ikari et al. | 210/32 |
| 4,277,346 | 7/1981 | Sakotani et al. | 210/691 |
| 4,299,739 | 11/1981 | Esposito et al. | 252/545 |
| 4,326,961 | 4/1982 | Lee et al. | 210/683 |
| 4,326,978 | 4/1982 | Moesch | 252/107 |
| 4,380,453 | 4/1983 | Claiborne | 8/606 |
| 4,661,282 | 4/1987 | Clark | 106/288 B |

FOREIGN PATENT DOCUMENTS

| | | |
|---|---|---|
| 44003 | 1/1982 | European Pat. Off. . |
| 132794 | 11/1978 | German Democratic Rep. . |
| 2309099 | 8/1973 | Fed. Rep. of Germany . |
| 2726192 | 12/1978 | Fed. Rep. of Germany . |
| 2814329 | 10/1979 | Fed. Rep. of Germany . |
| 47-42493 | 12/1972 | Japan . |
| 48-8394 | 3/1973 | Japan . |
| 48-29477 | 9/1973 | Japan . |
| 48-69780 | 9/1973 | Japan . |
| 48-69797 | 9/1973 | Japan . |
| 49-3760 | 1/1974 | Japan . |
| 51-20997 | 6/1976 | Japan . |
| 51-29129 | 8/1976 | Japan . |
| 53-19555 | 6/1978 | Japan . |
| 56-98265 | 8/1981 | Japan . |
| 517567 | 6/1976 | U.S.S.R. . |
| 1544430 | 4/1979 | United Kingdom . |

OTHER PUBLICATIONS

Marino et al., "Thermal Stability of Magnesium Aluminum Double Hydroxides Modified by Anionic Exchange," Thermochim. Acta 1982, 55(3), 377-383, (CA 97:44968).

Chemical abstract 92:135932a "Alumina as an Ion-Exchanger and its Application, Part III. pH and Adsorption of Anionic Dyes by Alumina".

Chemical abstract 94:144763q "Advanced Treatment of Dye Waste Water by Adsorption".

Chemical abstract 92:112623m "Application of Sodium Aluminum Silicates in Detergents. Part VIII. Dye Equilibriums in Multicomponent Systems".

Chemical abstract 89:79636f "Treatment of Dye-Containing Waste Water with Magnesium Compound Adsorbents".

Chemical abstract 93:79029t "The Adsorption of Cationic Dyes on Hydrated Zirconium Oxide".

Chemical abstract 98:166426s "Adsorption Treatment of the Waste Water from Dye synthesis".

Chemical abstract 89:91421q (re: Disclosure 1978, 171, 23).

Duwell et al., "The Preparation and Properties of Some Synthetic Inorganic Anion Exchangers," *Journal of Physical Chemistry*, 63, 2044-2047.

*Primary Examiner*—Robert Wax
*Attorney, Agent, or Firm*—Joe R. Prieto

[57] ABSTRACT

A water-insoluble pigment comprising a complex of a water-insoluble inorganic substrate exhibiting anion exchange properties, a water-soluble dye, and an anionic amphipathic material is disclosed.

32 Claims, No Drawings

INSOLUBLE PIGMENTS AND PREPARATION THEREOF

CROSS REFERENCE TO RELATED APPLICATION

This application is a continuation-in-part application of copending application Ser. No. 748,272, filed June 24, 1985, now abandoned.

BACKGROUND OF THE INVENTION

This invention relates to pigments and, more particularly, this invention relates to water-insoluble pigments which are prepared from water-soluble dyes, and methods for making such pigments.

Pigments and dyes are known in the art as coloring agents and are useful in various applications such as for coloring cosmetics, soaps, food, paints, plastics, and polymers. Dyes are generally liquids or soluble solids which are used in solution. Pigments, conversely, are generally solids and are usually insoluble in the medium in which the pigment is being used. Pigments are typically preferred over dyes in applications where color migration, or bleeding, is undesirable. For example, if a dye is used in a toothpaste formulation, the dye may be absorbed by the tongue, teeth and gums of the user. Similarly, in a two tone bar soap, a dye in one color section of the soap may migrate to a different color portion of the soap. Further, the soap dyes may stain the skin of the user as well as sink fixtures, etc. The use of an insoluble pigment in these applications prevents these undesirable occurrences.

Although there are a number of known water-insoluble pigments, some are considered to be unsuitable because they have been found to be questionable by government regulators on the ground of potential toxicity or carcinogenicity to the user. In addition, some insoluble pigments which are government-approved may suffer from a lack of color flexibility. These problems vary according to the use to which the pigments are put. In the case of soaps and cosmetics, for example, skin irritation may result from the incorporation of some known pigments.

Another example involves the use of water-insoluble pigments in food applications. While at present The Food and Drug Administration (FDA) has certified a number of dyes for this use, laboratory animal tests are now disclosing low level carcinogenicity of some of these dyes at high concentrations. This carcinogenicity is apparently due to the fact that the food dyes are absorbed by the body in the digestive tract. Currently available lakes (insolubilized food dyes) dissolve in the acidic environment of the stomach, releasing the dyes. Therefore, the FDA is considering decertification of the offending dyes and pigments made therefrom. As no replacements exist at present, the food processing industry may face major adjustments in its coloration expectations in the near future.

Related to food applications is the issue of the coloration of plastics that will be used in contact with food. Pending FDA regulation will require certification of any colorant used in contact with food, but current plastics colorants are for the most part unlikely to qualify for such certification, and dyes and pigments currently approved for food contact do not generally exhibit the chemical and thermal stability necessary for plastics processing.

A final problem encountered in the pigment and dye area is related to commercial desirability. In producing pigmetns from dyes, a loss of color brightness and intensity, along with hue changes, is encountered. While use of increased amounts of pigments will held to counteract these effects, the expensive cost of the dye precursor represents significant increases in costs associated with pigment production and, ultimately, of the soap, cosmetic, food, plastic or other polymer in which the colorant will be utilized.

Thus, it would be highly desirable to provide a nontoxic, noncarcinogenic, water-insoluble pigment which is suitable for use in body contact, ingestion and plastics processing applications and which has a relatively greater color flexibility. It would also be desirable to provide a method of preparing such a nontoxic, noncarcinogenic, chemically and thermally stable water-insoluble pigment.

SUMMARY OF THE INVENTION

In one aspect, the invention is a water-insoluble pigment comprising a complex of a water-insoluble, inorganic substrate exhibiting anion exchange properties, a water-soluble dye, and an anionic amphipathic material.

In another aspect, the invention is a method of preparing a water-insoluble pigment comprising contacting together a water-insoluble, inorganic substrate exhibiting anion exchange properties, a water-soluble dye and an anionic amphipathic material. In yet another aspect, the invention is the pigment produced by the aforementioned method.

DESCRIPTION OF THE PREFERRED EMBODIMENTS

As used herein the term "pigment" is meant to include any substance, usually in finely divided (i.e., powder) form, that is highly colored and imparts color to another substance or mixture as a result of dispersion therein. The pigment is insoluble in an aqueous medium under normal conditions of use.

Preparation of pigments, according to the present invention, requires, as a first component, a substrate exhibiting anion exchange properties, as a second component, a water-soluble dye, and as a third component, an anionic amphipathic material.

The "substrate exhibiting anion exchange properties" used in the present invention is essentially any inorganic anion exchange material exhibiting anion exchange properties, i.e., anion exchange capacity, under normal conditions of use. The term "substrate" will be used herein interchangeably with the terms "anion exchange material" and "anion exchanger." Various anion exchange materials are useful in the present invention including, for example, a metal oxide, a hydrous metal oxide, a metal hydroxide, a mixture of two or more metal oxides, a mixture of two or more hydrous metal oxides and a mixture of two or more metal hydroxides. The anion exchange material used may be amorphous (noncrystalline) or crystalline materials as determined by x-ray diffraction, electron diffraction, electron microscopy, and micro area x-ray fluorescence analysis.

A suitable substrate useful in the present invention may be a layered mixed metal hydroxide having anion exchange capacity. The layered anion exchange material may be described by the following general formula:

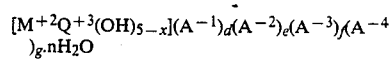

where M is a metal element or elements each with a positive valence of 2; Q is a metal element or elements each with a positive valence of 3; $A^{-1}$, $A^{-2}$, $A^{-3}$ and $A^{-4}$ are each one or more exchangeable anions each having a negative valence of 1, 2, 3, and 4, respectively; and n, x, d, e, f and g are real numbers greater than or equal to zero and satisfy the following:

$$0 < x \leq 1$$

$$d + 2e + 3f + 4g = x$$

$$0 \leq n \leq 10$$

Typical examples of substrates satisfying the above formula include, for example, $[MgAl(OH)_4]Cl^{-1} \cdot nH_2O$; $[MgAl(OH)_{4.7}]Cl_{0.3}^{-1} \cdot nH_2O$; $[MgAl(OH)_{4.6}](CO_3^{-2}) \cdot nH_2O$; and $[MgAl(OH)_{4.6}](Cl^{-1})_{0.2}(HCO_3^{-1})_{0.2} \cdot nH_2O$.

Generally, the above anion exchanger may be prepared by precipitation techniques known in the art for example, as described in U.S. Pat. Nos. 4,333,846; 4,392,979; 4,392,980; and 4,392,961. For example, metal compounds of M and Q above, such as the metal halides, sulfates, formates, hydrogen phosphate, hydroxides, acetate, nitrate, carbonates, bicarbonate, hydroxy chlorides, oxychlorides and the like or mixtures thereof including hydroxy carbonates, chlorohydroxide and the halogenated carboxylates of metals M and Q may be coprecipitated to form the hydroxides of the above general formula. The hydroxides are coprecipitated with a base such as an alkali metal base or ammonia at a pH range from about 8 to about 13, preferably from about 9 to about 11. Bases such as sodium hydroxide, Potassium hydroxide, or cummonium hydroxide may be used. M in the above general formula is preferably magnesium and Q is preferably aluminum.

Another substrate useful in the present invention is a layered mixed metal hydroxide having anion exchange capacity which may be described by the following general formula:

$$[M_x^{+2}Q_y^{+3}(OH)_{2x+3y-z}](A^{-1})_d(A^{-2})_e(A^{-3})_f (A^{-4})_g \cdot nH_2O$$

where M is a metal element or elements each with a positive valence of 2; O is a metal element or elements each with a positive valence of 3; $A^{-1}$, $A^{-2}$, $A^{-3}$, and $A^{-4}$ are each one or more exchangeable anions each having a negative valence of 1, 2, 3, and 4, respectively; and n, x, y, z, d, e, f, and g are real numbers greater than or equal to zero and satisfy the following:

$$0 < z \leq y$$

$$1.5 \leq x/y \leq 6$$

$$d + 2e + 3f + 4g = z$$

In the above equation the metal element or elements M may be selected from, for example, divalent metals such as magnesium, calcium, strontium, barium, iron, cobalt, manganese, nickel, copper, zinc, and mixtures thereof and the metal element or elements Q may be selected from trivalent metals such as aluminum, iron, chronium, gallium, cobalt, rhenium, indium and mixtures thereof. Preferably, M is magnesium and Q is aluminum. Included among the materials satisfying the above formula in the present invention is a mineral commonly known as hydrotalcite which has the chemical formula:

$$[Mg_3Al(OH)_8](CO_3) \cdot nH_2O$$

Hydrotalcite may be prepared synthetically by methods known in the art such as described in U.S. Pat. No. 3,539,306 and U.S. Pat. No. 3,650,704. Other anion exchangers and their preparation which may be used are described in Japanese Patent 1981-98265.

Yet another example of an anion exchange material useful in the present invention of the type having a layered crystalline structure may be represented by the following general formula:

$$[M_x^{+1}Q_y^{+2}Al(OH)_3](A^{-1})_d(A^{-2})_e (A^{-3})_f(A^{-4})_g \cdot nH_2O$$

where M is a metal element or elements each with a positive valence of 1; Q is a metal element or elements each with a postive valence of 2; $A^{-1}$, $A^{-2}$, $A^{-3}$, and $A^{-4}$ are each one positive valence of 2; A or more exchangeable anions each having a negative valence of 1, 2, 3, and 4, respectively; and n, x, y, d, e, f, and g are real numbers greater than or equal to zero and satisfy the following:

$$0 < x + 2y \leq 1$$

$$d + 2e + 3f + 4g = x + 2y$$

$$0 \leq n \leq 10$$

The above anion exchange materials include the magnesium aluminate anion exchangers described in U.S. Pat. No. 4,326,961, albeit, the formula is written in a different manner and these exchangers may be prepared in accordance with the method described in U.S. Pat. No. 4,326,961.

Other layered anion exchange materials and their preparation, within the scope of the above formula, may include, for example, the crystalline lithium aluminates described in U.S. Pat. No. 4,348,295 and 4,348,297.

Still another anion exchange material used in the present invention and its method of preparation is described in U.S. Pat. No. 3,002,932 and in an article by E. J. Duwell and J. W. Shepard, entitled "The Preparation and Properties of Some Synthetic Inorganic Anion Exchangers", *Journal of Physical Chemistry*, Vol. 63 (1959), pp. 2044–2047.

U.S. Pat. No. 3,002,932 describes amorphous or noncrystalline anion exchangers consisting essentially of mixed insoluble hydrated oxides of a pair of metals selected from the group consisting of aluminum, silicon, titanium, zinc and zirconium.

The above exchangers may be produced by coprecipitating mixed hydrated oxide of a pair of the metals above with the lower-valent number of said pair being present in a major molar amount and the higher-valent member of said pair being present in a minor molar amount, in an aqueous medium at a pH in the range of about 5 to 7. About 1 to about 25 mole percent of a selected suitable water-soluble derivative of the higher-valent member of the combination is dissolved in water together with about 99 to about 75 mole percent of a selected suitable water-soluble derivative of the lower valent member of the combination to give a solution containing from about 5 to about 20 weight percent of solute, and which is acidic, having a pH value below about 5. The resulting solution is brought up to a pH of 5 to 7 by the gradual addition of a base such as sodium hydroxide at a temperature of about 20° C. to about 90° C. A precipitate of mixed hydrated oxide or hydroxide forms and then the aqueous slurry is dried at a temperature below 150° C. Thereafter, the dried mixture is washed with water to remove soluble impurities therefrom.

Another anion exchange material used in the present invention and its method of preparation is described in U.S. patent applications, No. 748,271, now U.S. Pat. No. 4,661,282 and 748,274, now abandoned filed of even date herewith and entitled "Inorganic Anion Exchangers and Preparation Thereof." The preferred anion exchange materials used in the present invention and their method of preparation are those described in the above patent applications. The substrate consists essentially of a combination of metal hydroxides, hydrated metal oxides, and metal oxides of a pair of metal cations or elements. A first metal element of the pair of metal elements has a lower positive valence than that of a second metal element. The first lower valent member has a positive valence lower by unity than that of the second higher valent member of the pair. For example, if the first metal element has a positive valence of 2, the second metal element has a positive valence of 3; if the first metal element has a positive valence of 3, then the second metal element has a positive valence of 4, and so on. Metal elements with a +2 valence may be selected from elements such as magnesium, calcium, strontium, barium, iron, cobalt, manganese, nickel, copper, zinc and mixtures thereof; metal elements with a valence of +3 may be selected from elements such as aluminum, iron, chromium, gallium, cobalt, rhenium, indium and mixtures thereof; metal elements having a +4 valence may be selected from elements such as titanium, germanium, tin, lead, zirconium, hafnium, vanadium and mixtures thereof; metal elements having a +5 valence may be selected from elements such as antimony, vanadium, niobium, tantalum and mixtures thereof; and metal elements having a +6 valence may be selected from elements such as chromium, molybdenum, tungsten and mixtures thereof.

The metal oxides, hydrous metal oxides and metal hydroxides of the present invention may be described by the general formula:

$$[M^a{}_{1-x}Q_x{}^{a+1}O_y(OH)_z](A^{-1})_d(A^{-2})_e(A^{-3})_f(A^{-4})_g \cdot nH_2O$$

where M is a metal element or elements each with a positive valence of a; Q is a metal element or elements each with a positive valence of a+1; a is 2, 3, 4 or 5; $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, y, z, d, e, f and g are real numbers greater than or equal to zero and satisfy the following:

$2y + z = a$ $0 < d + 2e + 3f + 4g \leq x$ $0 \leq n \leq 10$

Preferably, the elements M and Q are selected from the group consisting essentially of aluminum, titanium, and magnesium. More preferably, mixed metal hydroxides, hydrated metal oxides, and metal oxides of aluminum and titanium and mixed metal hydroxides, hydrated metal oxides and metal oxides of magnesium and aluminum are used as the anion exchange material herein described.

A preferred anion exchange material of the present invention comprising a combination of aluminum and titanium metal elements may be represented by the following general formula:

$$Al_{1-x}Ti_xO_y(OH)_z](A^{-1})_d(A^{-2})_e(A^{-3})_f(A^{-4})_g \cdot nH_2O$$

where $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, y, z, d, e, f, and g are real numbers greater than or equal to zero and satisfy the following:

$2y + z = 3$ $0 < d + 2e + 3f + 4g \leq x$ $0 \leq n \leq 10$

Another preferred anion exchange material of the present invention comprising a combination of magnesium and aluminum metal elements may be represented by the following general formula:

$$[Mg_{1-x}Al_xO_y(OH)_z](A^{-1})_d(A^{-2})_e(A^{-3})_f(A^{-4})_g \cdot nH_2O$$

where $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, y, z, d, e, f, and g are real numbers greater than or equal to zero and satisfy the following:

$2y + z = 2$ $0 < d + 2e + 3f + 4g \leq x$ $0 \leq n \leq 10$

The exchangeable anions of any of the aforementioned compositions may be selected from any inorganic or organic exchangeable anions commonly known in the art of anion exchangers. The exchangeable anions may be selected from monovalent, bivalent, trivalent, tetravalent anions or mixtures of two or more of these exchangeable anions. In the above formulas, the anion $A^{-1}$, for example, may be an inorganic anion selected from halides such as fluorides ($F^{-1}$); chlorides ($Cl^{-1}$); bromides ($Br^{-1}$) and iodides ($I^{-1}$); carbonates such as ($HCO_3^{-1}$); nitrates ($NO_3^{-1}$); sulfates such as ($HSO_4^{-1}$); phosphates such as ($H_2PO_4^{-1}$); permanganates such as ($MnO_4^{-1}$); hydroxides such as ($OH^{-1}$) and mixtures thereof. For example, the anion $A^{-1}$ may be a combination of two or more exchangeable anions described above, such as a mixture of $Cl^{-1}$ and $HCO_3^{-1}$ anions. In the above formulas, the anion $A^{-2}$, for example, may be an inorganic anion selected from carbonates such as $CO_3^{-2}$; sulfates such as $SO_4^{-2}$; phosphates such as $HPO_4^{-2}$; and mixtures thereof. For example, the anion $A^{-2}$ may be a combination of two or more exchangeable anions described above such as a mixture of $SO_4^{-2}$ and $CO_3^{-2}$. In the above formulas, the anion $A^{-3}$, for example, may be phosphates such as $PO_4^{-3}$. The anions $A^{-4}$, used in the above formulas, may be, for example, organic anions such as ethylenediaminetetraacetic acid (EDTA) and diphosphates such as

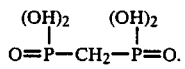

Other organic exchangeable anions used in the above formulas may include, for example, stearates, formates, acetates, benzoates and mixtures thereof.

In addition to the above anions used in the present invention, the compositions above may have a combination of two or more exchangeable anions selected from the group of $A^{-1}$, $A^{-2}$, $A^{-3}$, and $A^{-4}$ as described above. For example, the compositions may include a mixture of anions such as $Cl^{-1}$ and $CO_3^{-2}$ anions or $Cl^{-1}$ and $SO_4^{-2}$ anions. The total negative charge of the changeable anion or mixture of exchangeable anions selected for the above compositions should be sufficient to balance the excess positive charge of the metal oxides, hydrated oxides and hydroxides of the above compositions. A suitable exchangeable anion used in any of the final compositions described above is the sulfate anion ($SO_4^{-2}$).

The coprecipitation method described in the aforementioned U.S. patent applications, No. 748,271, now U.S. Pat. No. 4,661,282 and 748,274, now abandoned, is used to prepare the anion exchangers described above.

The second component of the present invention is a water-soluble dye. The term "dye", as used herein, is meant to include material that will bind, by an anion exchange mechanism, to the material to which it is applied and which will impart the appearance of a solid color to a formulation with which it is mixed. "Water-soluble dye" means that the dye is at least slightly soluble (i.e., at least about 0.01 weight percent soluble) in either pure neutral water, an aqueous salt solution, or an aqueous alkaline or acidic solution in which the dye remains chemically stable.

Any dye and mixtures of two or more dyes which will complex with the anion exchange material used herein may be used. Preferably, the dyes used are those which are designated by the United States Food and Drug Administration (FDA) as Food, Drug and Cosmetic (FD&C) colors, Drug and Cosmetic (D&C) colors and mixtures thereof. For example, FD&C Blue No. 1, Blue No. 2, Green No. 3, Red No. 3, Yellow No. 5, Yellow No. 6, and mixtures thereof, are preferred dyes. Examples of D&C dyes preferred include Green No. 8, Yellow No. 7, Yellow No. 10 and mixtures thereof. These dyes, and their structures and properties are well known to those skilled in the art. Further information may be obtained for instance, in "Kirk-Othmer Encyclopedia of Chemical Technology," 3rd Edition, Volume 6, pages 561-596.

The third component of the present invention is an anionic amphipathic material. An amphipathic molecule is defined in Organic Chemistry, by Morrison and Boyd, 3rd Edition, N.Y. 1973, at page 1060. An amphipathic molecule contains both a hydrophilic (water-loving) end and a hydrophobic (water-fearing) end. In the present invention, it is preferred to use an anionic amphipathic material, i.e., the amphipathic material should have a functional group with a negative charge, i.e., $CO_2^{-1}$ or $SO_3^{-1}$ at its hydrophilic end which can be used to exchange with the anion of the substrate and thus "attach" to the substrate. The substrate is rendered hydrophobic by attaching a sufficient amount of anionic amphipathic material to the substrate. It is believed that the anionic amphipathic material provides a coating of hydrophobicity to the final pigment particle. By "coating of hydrophobicity" it is meant that the pigment particle as a whole will be antagonistic to water, i.e., "hydrophobic." Preferably, the anionic amphipathic material used is slightly soluble in water. Examples of anionic amphipathic material used in the present invention consists essentially of a long-chain organic functionality which will exhibit hydrophobicity under normal conditions of use and contains a functional group with a negative charge as described above. The anionic amphipathic material may include, for example, stearic acid and an alkali metal salt thereof such as sodium stearates, saturated and unsaturated fatty acids and salts thereof with a carbon chain length of at least about eight and above, for example, caprate $[CH_3(CH_2)_8COOH]$, sodium caprate $[CH_3(CH_2)_8COO^-Na^+]$, sodium oleate, and sodium laurate; sulfonated organic compounds with carbon chain lengths of at least about eight and above such as sodium lauryl sulfate; and anionic soap molecules such as sodium cocoate, sodium tallowate and mixtures thereof.

Because the anion amphipathic material above provides the pigments of the present invention with hydrophobicity, the hydrophobic pigments are particularly useful in providing a uniform dispersion in a nonaqueous, nonpolar material such as organic polymers, plastics and nonaqueous solvents, and the pigments advantageously prevent interaction of aqueous phase materials with the pigment. The hydrophobicity of the pigment is an important feature and is useful in applications, for example, when there is an agent in an aqueous phase such as other inorganic anions, soaps, detergents, surfactants or fatty acids and salts thereof which would ordinarily react with the pigment to cause color loss by anion exchange or other mechanisms. In these applications, the hydrophobic character of the pigment causes the pigment surface to repel the aqueous phase, thus minimizing the undesirable reaction. For example, it has been determined that the hydrophilic end of the soap molecule will attack pigments known in the art, which have been made by insolublizing a dye, to cause color loss. It has now been shown that when a pigment is pretreated with an anionic amphipathic material such as sodium stearate (a long chain fatty acid), the anion exchange reaction attaches a sufficient amount of long chain organic groups to the pigment particles such that the whole particle surface becomes hydrophobic. Thus, the hydrophobic end of the soap molecule associates with the hydrophobic surface of the pigment which results in minimizing color loss.

In carrying out the method according to the present invention, the anion exchange material, the water-insoluble dye and anionic amphipathic material are contacted together under conditions in which a water-insoluble pigment is obtained. "Water-insoluble pigment" means that the pigment is not appreciably soluble (i.e., less than about 0.01 weight percent soluble) in either pure neutral water, an aqueous salt solution, or an aqueous alkaline or acidic solution in which the pigment remains chemically stable. Desirably, the anion exchange material and water-soluble dye are first contacted together in a liquid medium in which the dye has been dissolved. The dye may be dissolved in water and the anion exchange material added to the water. Another method of contacting the dye and anion exchange material involves passing the dye dissolved in water through a bed of anion exchange material in an ion-exchange column. Other methods which provide sufficient intimate contact between the materials may be used. Once the dye and anion exchange material are contacted together, an insoluble complex forms immediately, i.e., in less than about 10 seconds.

After the dye and anion exchange material are contacted with the dye and anion exchange complex to form the pigment of the present invention. The same methods described above used for contacting the dye and anion exchange material may be used for contacting the anionic amphipathic material with the dye and anion exchange complex. The anionic amphipathic material is added so as to induce an ion exchange reaction in the medium in which the agent is soluble.

The amount of the dye and anionic amphipathic material attached to the anion exchange material substrate orresponds to the total exchange capacity of the substrate used. For example, the substrate may have an anion exchange capacity of about 0.5 meq/g to about 3.0 meq/g, and preferably from about 1.0 meq/g to about 2.0 meq/g. Generally, the amount of dye on the substrate is preferably from about 1 percent to about 40 percent by weight. The anionic amphipathic material may be from about 1 percent to about 30 percent and preferably from about 5 percent to about 20 percent by weight.

Another method of preparing the pigment of the present invention is to precipitate the anion exchange material in the presence of the dye, the anionic amphipathic material and other desired additives such as the $CO_3^{-2}$ or $SO_4^{-2}$ divalent salts. The method may be carried out in batch or continuous operation. Preferably, an aqueous solution of the dye, anionic amphipathic material and the other desired components is formed. Then an aqueous solution of the water-soluble salts of M and Q, such as previously described, is formed. Thereafter, a base such as sodium hydroxide or ammonia, the salt solution and the solution of the dye, anionic amphipathic material and other components are substantially simultaneously contacted together to form a precipitate. The precipitate is the pigment material according to the present invention. The metal salts of M and Q may be dissolved in water separately or together and thereafter contacted with the above solutions as described above. Sufficient base should be used to maintain the desired pH constant and to precipitate the anion exchange substrate.

The various pigment materials produced by the above methods may be used, alone, or in combination with each other to form different color pigment materials. For example, a yellow pigment may be blended with blue pigment to form a green pigment.

The size of the pigment particles obtained can vary widely. Typically, for some applications, such as coloring agents for soaps, the particle size is preferably from about 200 angstroms to about 20 microns in diameter. The size of the precipitated particle obtained according to the present invention is preferably in the range of from about 200 angstroms to about 20 microns. The size of the particles can be controlled by controlling variables such as reagent selection, temperature, pH, concentration, and stirring speed during the precipitation steps. It is also to be understood that larger size particles than 20 microns can be ground to the desired size.

The pigments may be added to toiletries such as soaps (e.g., soap bars), toothpastes and cosmetics in amounts such that the desired color is obtained using techniques known in the art. The pigments of this invention can also be added to other items such as paints, plastics, polymers, fabric or food which are desirable to be colored.

When the pigments are to be used in plastics, one method of incorporation would be to use the pigment desired in either a dry powder form or as a paste or slurry in a suitable solvent. The particular solvent will depend on the plastic used. The pigment is then added or mixed with the pellets or granules of either a thermoplastic or thermoset resin at the time of processing. Because of the significant thermal stability of pigments formed from insolubilized dyes by the formulation of the present invention, a number of processing methods may be employed. These include molding by methods such as: injection molding; compression molding; vacuum forming; blow molding; structural foam, including conventional low pressure, high pressure and expanding mold using either chemical or physical blowing agents; extrusion, including profile, pipe, wire and cable, sheet and coetrusion; coinjection molding; and thermoforming. The incorporation of the insoluble pigments is accomplished by whatever method would be used to incorporate a dye colorant into the selected high polymer, e.g., melt-blending. These pigments, in being incorporated into the plastic material, are chemically and thermally stable. The insolubility of the dye is maintained throughout processing and in the final polymer material, so that the dye cannot be adsorbed onto any food with which it comes into contact. This feature will satisfy any FDA regulations and avoid any problems of suspected or actual carcinogenicity associated with dye ingestion. Typical applications will contain a level of pigment within the range of from about 0.001 to about 0.1 percent by weight; however, the pigment level will vary substantially according to the tint strength of the particular pigment, the resin selected and a number of other variables.

When dyes are to be intentionally used as food colorants, prior insolubilization through the method of the present invention to produce pigments also provides some protection against physiological dangers that may be associated with the dye precursors themselves. It has been found that some of these pigments are stable in very acid pH environments, such as the stomach. The pigments possessing this stability, at low pH levels in particular, are primarily those in which M, in any of the substrate formulas above, is aluminum and Q is titanium. Because a water-soluble dye complexed with a water-insoluble inorganic substrate of this formula and an organic amphipathic material remains insoluble throughout the digestive process, it cannot be absorbed into any bodily tissues in which it may cause harm. Typical levels of these pigments in food are small and usually vary from about 0.0001 percent to about 0.1 percent by weight.

The pigment produced by the present invention may be used in any of its applications either alone or in combination with other additives which are not detrimental to the pigment properties. Other materials or components which may be mixed with the pigment may include, for example, fillers such as clays, and extenders such as $TiO_2$, $Al_2O_3$, and $Al(OH)_3$ which will not substantially adversely affect the pigment properties. Other additives may be used, for example, to pelletize, agglomerate or coat the pigment, provided the pigment properties are not substantially adversely affected. The various additives used with the pigment will depend on the application in which the pigment is used.

In addition to using other materials as additives along with the pigments of the present invention in a designated application, certain materials may be complexed with the pigment components to increase the efficacy of the colorant. One problem encountered with pigments made from insolubilized dyes is a loss of color brightness and intensity and also color hue changes occurring during the insolubilization process. These problems increase as the amount of dye insolubilized increases in proportion to the substrate. An effective way of counteracting this problem is through the complexing of a water-soluble polymer with the basic pigment complex. Modified suspending agents such as cellulosic materials work particularly well. These include carboxymethyl methylcellulose, carboxymethylcellulose and other water-soluble polymers with an anionic functionality. The polymer serves to stabilize the color hue and maintain the original brightness and intensity of the dye precursor. An added advantage is that the polymer is insolubilized along with the other pigment components and thus does not affect the inert nature of the pigment particularly desired for many applications, such as in food, cosmetics, and food-contact plastics. The celluloses are of themselves generally physiologically inert anyway.

It is preferably when adding a water-soluble polymer to use up to about 3 percent by weight of the polymer and up to about 10 percent by weight of the dye, the remainder being the inorganic anion exchange material and anionic amphipathic material. The reduced amount of dye needed. therefore, to produce a pigment capable of imparting a given brightness level and hue stability represents a substantialy cost savings in many applications, and the addition of the polymer does not affect other properties of the pigment, such as its chemical and thermal stability and physiological inertness.

The general preferred process for adding the water-soluble polymer comprises steps including dissolving the components of the selected inorganic anion exchange material in water; dissolving the water-soluble polymer in water; combining the two solutions with a source of alkalinity to precipitate the anion exchange material in the presence of the water-soluble polymer; and adding a selected water-soluble dye to the suspended precipitate. The pigment product may then be washed with suitable pH distilled water to remove excess reactants and by-products. Alternatively, the pigment can be completely synthesized first, then the water-soluble polymer added to it in aqueous solution.

The following examples are intended to illustrate the invention and are not intended to limit the scope thereof. In the examples, all parts and percentages are by weight unless otherwise specified. The soap used in the examples was conventional soap consisting essentially of 20 percent by weight sodium cocoate and 80 percent by weight sodium tallowate.

EXAMPLE 1

A layered magnesium aluminate of the form [MgAl(OH)$_4$](Cl) was made by dissolving 100 g of sodium aluminate in 500 ml of water and then adding a solution of 200 g MgCl$_2$.6H$_2$O in 400 ml of water. The pH was kept at 10.5 by the addition of sodium hydroxide. The resultant solid precipitate was filtered and washed. A 20 g sample of the precipitate was slurried in 200 ml of water. Then 4 g of FD&C Blue No. 1 dye was added to the slurry followed by 2 g of sodium stearate dissolved in 100 ml of water. The resultant pigment was filtered and washed. A 1 g portion of the pigment was tested by stirring the pigment in with a 2 weight percent soap solution for 2 hours. The pigment showed no color loss into the solution as determined by visual inspection.

EXAMPLE 2

A layered magnesium aluminate of the form [MgAl(OH)$_4$(Cl) was made by dissolving 100 g of sodium aluminate in 500 ml of water and adding a solution of 200 g MgCl$_2$.6H$_2$O in 400 ml of water. The pH was kept at 10.5 by the addition of sodium hydroxide. The resultant solid precipitate was filtered and washed. A 20 g sample of the precipitate was slurried in 200 ml of water. Then 4 g of D&C Green No. 8 dye was added to the slurry followed by 2 g of sodium oleate dissolved in 100 ml of water. The resultant pigment was filtered and washed. A 1 g portion of the pigment was tested by stirring with a 2 percent soap solution for 2 hours. No color loss into solution could be detected visually.

EXAMPLE 3

A 10 g sample of synthetic hydrotalcite of the composition [Mg$_3$Al(OH)$_8$](CO$_3$).nH$_2$O was slurried in 200 ml of water. To this slurry was added 0.5 g of D&C Green No. 8 dye. A 1 g sample of sodium stearate dissolved in 100 ml of water was added to the slurry and the resultant pigment was filtered and washed. A 1 g portion of the pigment was stirred with 100 ml of a 2 percent soap solution for 4 hours. No visually detectable bleeding of color into solution was observed.

EXAMPLE 4

A 10 g sample of synthetic hydrotalcite of the composition [Mg$_3$Al(OH)$_8$](CO$_3$).nH$_2$O was slurried in 200 ml of water. To this slurry was added 0.5 g of FD&C Blue No. 1 dye. A 1 g sample of sodium stearate dissolved in 100 ml of water was added to the slurry and the resultant pigment was filtered and washed. A 1 g portion of the pigment was stirred with 100 ml of a 2 percent soap solution for 4 hours. No visually detectable bleeding of color into solution was observed.

EXAMPLE 5

A 10 g sample of synthetic hydrotalcite of the composition [Mg$_3$Al(OH)$_8$](CO$_3$).nH$_2$O was slurried in 200 ml of water. To this slurry was added 0.5 g of FD&C Blue No. 1 dye. A 1 g sample of sodium oleate dissolved in 100 ml of water was added to the slurry and the resultant pigment was filtered and washed. A 1 g portion of the pigment was stirred with 100 ml of a 2 percent soap solution for 4 hours. No visually detectable bleeding of color into solution was observed.

EXAMPLE 6

A 10 g sample of synthetic hydrotalcite of the composition [Mg$_3$Al(OH)$_8$](CO$_3$).nH$_2$O was slurried in 200 ml of water. To this slurry was added 0.5 g of D&C Green No. 8 dye. A 1 g sample of sodium oleate dissolved in 100 ml of water was added to the slurry and the resulting pigment was filtered and washed. A 1 g portion of the pigment was stirred with 100 ml of a 2 percent soap solution for 4 hours. No visually detectable bleeding of color into solution was observed.

EXAMPLE 7

A 10 g sample of synthetic hydrotalcite of the composition [Mg$_2$Al(OH)$_8$](CO$_3$).nH$_2$O was slurried in 200 ml of water. To this slurry was added 0.5 g of D&C Green No. 8 dye. A 1 g sample of sodium stearate dissolved in 100 ml of water was added to the slurry and the resulting pigment was filtered and washed. A 1 g portion of the pigment was stirred with 100 ml of a 2 percent soap solution for 4 hours. No visually detectable bleeding of color into solution was observed.

EXAMPLE 8

A 10 g sample of synthetic hydrotalcite of the composition $[Mg_2Al(OH)_8](CO_3).nH_2O$ was slurried in 200 ml of water. To this slurry was added 0.5 g of D&C Green No. 8 dye. A 1 g sample of sodium laurate dissolved in 100 ml of water was added to the slurry and the resultant pigment was filtered and washed. A 1 g portion of the pigment was stirred with 100 ml of a 2 percent soap solution for 4 hours. No visually detectable bleeding of color into solution was observed.

EXAMPLE 9

A 10 g sample of synthetic hydrotalcite of the composition $[Mg_2Al(OH)_8](CO_3).nH_2O$ was slurried in 200 ml of water. To this slurry was added 0.5 g of D&C Green No. 8 dye. A 1 g sample of sodium cocoate and sodium tallowate soap mixture dissolved in 100 ml of water was added to the slurry and the resultant pigment was filtered and washed. A 1 g portion of the pigment was stirred with 100 ml of a 2 weight percent soap solution for 4 hours. No visually detectable bleeding of color into solution was observed. It was observed, however, that this pigment material showed a high dispersibility in the soap solution as well as in solid soap chips.

EXAMPLE 10

A 10 g sample of synthetic hydrotalcite of the composition $[Mg_3Al(OH)_8](CO_3).nH_2O$ was slurried in 200 ml of water. To this slurry was added 0.5 g of D&C Green No. 8 dye and the resultant pigment was filtered and washed. A 1 g portion of the pigment was stirred with 100 ml of a 2 percent soap solution for 4 hours. Substantial color loss from the pigment into the soap solution was observed.

EXAMPLE 11

A 10 g sample of synthetic hydrotalcite of the composition $[Mg_3Al(OH)_8](CO_3).nH_2O$ was slurried in 200 ml of water. To this slurry was added 0.5 g of FD&C Blue No. 1 dye and the resultant pigment was filtered and washed. A 1 g portion of the pigment was stirred with 100 ml of a 2 percent soap solution for 4 hours. Substantial color loss from the pigment into the soap solution was observed.

EXAMPLE 12

A 10 g sample of synthetic hydrotalcite of the composition $[Mg_3Al(OH)_8](CO_3).nH_2O$ was slurried in 200 ml of water. To this slurry was added 0.5 g of FD&C Blue No. 1 dye. 1 g of sodium caprylate dissolved in 100 ml of water was then added and the resultant pigment was filtered and washed. A 1 g portion of the pigment was stirred with 100 ml of a 2 percent soap solution for 4 hours. Some color loss from the pigment into the soap solution was observed.

EXAMPLE 13

A solution was made consisting of 1 g of FD&C Blue No. 1 dye, 1 g $Na_2CO_3$, and 2 g sodium lauryl sulfate in 400 ml of water. This solution was heated to 50° C. with stirring and 100 ml of a solution which was 0.4 M $MgCl_2.6H_2O$ and 0.4 M $AlCl_3.6H_2O$ was added dropwise along with sufficient NaOH to maintain the pH at 9.4. The precipitate was filtered and washed with distilled water.

EXAMPLE 14

A solution was made consisting of 1 g D&C Green No. 8, 1 g $Na_2CO_3$, and 2 g sodium lauryl sulfate in 500 ml of water. This solution was heated to 50° C. with stirring and 100 ml of a solution which was 0.4 M $MgCl_2.6H_2O$ and 0.4 M $AlCl_3.6H_2O$ was added along with sufficient NaOH to maintain the pH at 9.4. The precipitate was filtered and washed.

EXAMPLE 15

A green pigment material was made by mixing the products of Example 1 and Example 2 in the proportion of 1 to 10 by weight.

EXAMPLE 16

A green pigment was made by the same procedure as Example 1 except 1 g of FD&C Blue No. 1 and 1 g D&C Green No. 8 were dissolved with 2 g $Na_2CO_3$, and 4 g sodium lauryl sulfate. This solution was mixed with 200 ml of 0.4 M solution of $MgCl_2.6H_2O$ and 0.4 M $AlCl_3.6H_2O$ at 50° C. and kept at a pH of 9.4. The product was filtered and washed and produced a green pigment resulting from the combination of the two dye colors.

EXAMPLE 17

A 1,000 ml aqueous solution was prepared containing 203 g of $MgCl_2.6H_2O$ and 243 g of $AlCl_3.6H_2O$. A second solution was prepared containing 600 ml of concentrated $NH_3$, 400 ml of water, and 10 g of $Na_2CO_3$. The two solutions were mixed rapidly by pumping simultaneously and separating the two solutions through two separate inlets of a "T" joint with the resultant precipitate material exiting the outlet end of the "T" joint. The resultant precipitate material was of very small particle size. The precipitate was filtered and washed. The wet filter cake material was resuspended in 1,000 ml of water, then a 300 ml aqueous solution containing 20 g of D&C Green No. 8 dye, 4 g of sodium lauryl sulfate, and 2 g of $Na_2CO_3$ was added to the suspension with stirring. The resultant highly colored green pigment material was filtered and washed.

EXAMPLE 18

A 1,000 ml aqueous solution was prepared containing 203 g $MgCl_2.6H_2O$ and 243 g of $AlCl_3.6H_2O$. A second solution was prepared containing 600 ml of concentrated $NH_3$, 400 ml of water, and 10 g of $Na_2CO_3$. The two solutions were mixed rapidly by pumping simultaneously and separating the two solutions through two separate inlets of a "T" joint with the resultant precipitate material exiting the outlet end of the "T." The resultant precipitate material was of very small particle size. The precipitate was filtered and washed. The wet filter cake material was resuspended in 1,000 ml of water, then a 300 ml aqueous solution containing 20 g of FD&C Blue No. 1 dye, 4 g of sodium lauryl sulfate, and 2 g of $Na_2CO_3$ was added to the suspension with stirring. The resultant highly colored green pigment material was filtered and washed.

EXAMPLE 19

A 1,000 ml aqueous solution was prepared containing 203 g MgCl$_2$.6H$_2$O and 243 g of AlCl$_3$.6H$_2$O. A second solution was prepared containing 600 ml of concentrated NH$_3$, 400 ml of water and 10 g of Na$_2$CO$_3$. The two solutions were mixed rapidly by pumping simultaneously and separating the two solutions through two separate inlets of a "T" joint with the resultant precipitate material exiting the outlet end of the "T" joint. The resultant precipitate material was of very small particle size. The precipitate was filtered and washed. The wet filter cake material was resuspended in 1,000 ml of water, then a 300 ml aqueous solution containing 18 g of D&C Green No. 8 dye, 2 g of FD&C Blue No. 1, 5 g of sodium lauryl sulfate, and 2 g of Na$_2$CO$_3$ was added to the suspension with stirring. The resultant highly colored green pigment material was filtered and washed.

EXAMPLE 20

A 1,000 g sample of [MgAl(OH)$_{4.7}$]Cl$_{0.3}$.nH$_2$O, synthesized by the rapid precipitation of AlCl$_3$ and MgCl$_2$ as described in Example 19 was suspended in water to form an 8 percent by weight slurry. To this suspension was added a 150 ml aqueous solution made from 2.72 g of D&C Green No. 8 dye and 0.48 g FD&C Green No. 3 dye. The resultant material was stirred to disperse the dye into the suspension. A 6.4 g sample of sodium stearate was dissolved in 150 ml of water with heating and then the sodium stearate solution was added to the suspension with stirring. The resultant green pigment slurry was filtered, washed and resuspended in water to a total volume of 1,200 ml.

EXAMPLE 21

A 1,000 g sample of [MgAl(OH)$_{4.7}$]Cl$_{0.3}$.nH$_2$O, synthesized by the rapid precipitation of AlCl$_3$ and MgCl$_2$ as described in Example 19 was suspended in water to form an 8 percent by weight slurry. To this suspension was added a 150 ml aqueous solution made from 2.72 g of D&C Green No. 8 dye and 0.48 g FD&C Green No. 3 dye. The resultant material was stirred to disperse the dye into the suspension. A 12.5 g sample of a 28 percent solution of sodium lauryl sulfate was dissolved in 150 ml of water with heating and then the sodium lauryl sulfate solution was added to the suspension with stirring. The resultant green pigment slurry was filtered, washed and resuspended in water to a total volume of 1,200 ml.

EXAMPLE 22

About 100 g of MgCl$_2$.6H$_2$O and about 29.7 g AlCl$_3$.6H$_2$O and about 5 g MgCO$_3$ were dissolved in 250 ml of H$_2$O and then coprecipitated in 300 ml of 1 percent carboxymethyl methylcellulose at pH 11 by the addition of 50 percent sodium hydroxide. The resulting precipitate was diluted to 800 ml. A 100 ml portion was mixed with 0.125 g D&C Green No. 8 dye and 0.25 g of sodium lauryl sulfate. The pigment product was centrifuged, washed with distilled water at pH 11 and recentrifuged. The final product was a wet cake material with uniform color, smooth texture and fluorescent-like brightness which was not soluble in water from pH 7 to 12. In particular, the pigment retained a hue and brightness very similar to that of the water soluble dye.

EXAMPLE 23

A pigment was made from [Al$_{0.9}$Ti$_{0.1}$O(OH)]-Cl$_{0.1}$.nH$_2$O by suspending about 20 g of the solid in 300 ml of water. A solution of 2.0 g sodium lauryl sulfate and 2.0 g D&C Green No. 8 dye in 200 ml of water was added to the slurry with stirring. The slurry was stirred, filtered and washed with water. About a 1 g portion of this material was suspended in 200 ml of water and the pH was dropped to 1.7 by the addition of HCl. After 10 minutes, the solid pigment was removed by filtration and centrifugation to remove fines. The filtrate showed less than about 1 ppm of dye present in solution.

What is claimed is:

1. A water-insoluble pigment comprising a complex of a water-insoluble inorganic substrate exhibiting anion exchange properties, a water-soluble dye, and an anionic amphipathic material.

2. The pigment of claim 1 wherein the substrate is selected from the group consisting of an oxide, a hydrous oxide and a hydroxide of metal elements.

3. The pigment of claim 2 wherein the metal elements of the substrate are selected from the group consisting of aluminum, titanium, and magnesium.

4. The pigment of claim 3 wherein the metal elements of the substrate are aluminum and titanium.

5. The pigment of claim 3 wherein the substrate has the formula:

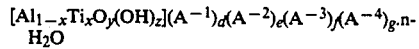

where $A^{-1}$, $A^{-2}$, $A^{-3}$ and $A^{-4}$ are each one or more exchangeable anions each having a negative valence of 1, 2, 3, and 4, respectively; x is $0 < x \leq 0.5$; and n, y, z, d, e, f, and g are real numbers greater than or equal to zero and satisfy the following:

$$2y+z=3$$

$$0 < d+2e+3f+4g \leq x$$

$$0 \leq n \leq 10$$

6. The pigment of claim 3 wherein the substrate has the formula:

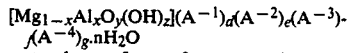

where $A^{-1}$, $A^{-2}$, $A^{-3}$ and $A^{-4}$ are each one or more exchangeable anions each having a negative vaience of 1, 2, 3, and 4, respectively; x is $0 < x \leq 0.5$; and n, y, z, d, e, f, and g are real numbers greater than or equal to zero and satisfy the following:

$$2y+z=2$$

$$0 < d+2e+3f+4g \leq x$$

$$0 \leq n \leq 10$$

7. The pigment of claim 1 wherein $A^{-1}$ is one or more anions selected from the group consisting of halides, hydroxides, nitrates, phosphates, hydrogen carbonates, hydrogen sulfates, and mixtures thereof; $A^{-2}$ is one or more anions selected from the group consisting of phosphates, carbonates, sulfates, and mixtures thereof; $A^{-3}$ is one or more anions consisting of phosphates; and $A^{-4}$ is one or more anions consisting of ethylenediaminetetraacetic acid, diphosphates, and mixtures thereof.

8. The pigment of claim 1 wherein $A^{-1}$ is selected from the group consisting of $Cl^{-1}$, $Br^{-1}$, $F^{-1}$, $I^{-1}$, $H_2PO_4^{-1}$ and mixtures thereof and e, f, and g are 0.

9. The pigment of claim 1 wherein $A^{-2}$ is selected from the group consisting of $SO_4^{-2}$, $CO_3^{-2}$, $HPO_4^{-2}$ mixtures thereof and d, f, and g are 0.

10. The pigment of claim 1 wherein $A^{-1}$ is $Cl^{-1}$, $A^{-2}$ is $SO_4^{-2}$ and f and g are 0.

11. The pigment of claim 1 wherein the dye is an anionic dye.

12. The pigment of claim 10 wherein the dye is a sulfonated dye.

13. The pigment of claim 10 wherein the dye is a FD&C dye.

14. The pigment of claim 10 wherein the dye is a D&C dye.

15. The pigment of claim 12 wherein the dye is selected from the group consisting essentially of FD&C Blue No. 1, Blue No. 2, Green No. 3, Red No. 3, Yellow No. 5, Yellow No. 6 and mixtures thereof.

16. The pigment of claim 13 wherein the dye is selected from the group consisting essentially of D&C Green No. 8, Yellow No. 7, Yellow No. 10 and mixtures thereof.

17. The pigment of claim 14 wherein the dye is FD&C Green No. 3.

18. The pigment of claim 15 wherein the dye is D&C Green No 8.

19. A soap containing the pigment of claim 1.

20. The pigment of claim 1 wherein the anionic amphipathic material is selected from the group consisting of an organic fatty acid and salts thereof and sulfonated organic compounds.

21. A method of preparing a water-insoluble pigment comprising contacting together an inorganic water-insoluble anion exchnnge material, a water-soluble dye, and an anionic amphipathic material.

22. The method of preparing a water-insoluble pigment comprising:
    (a) providing an inorganic water-insoluble anion exchange material in an aqueous medium;
    (b) contacting the anion exchange material with a water-soluble dye; and
    (c) contacting the product of step (b) with an anionic amphipathic material.

23. A pigment produced by the method of claim 21.

24. A pigment produced by the method of claim 22.

25. A thermoplastic resin containing the pigment of claim 1.

26. A thermoset resin containing the pigment of claim 1.

27. A food containing the pigment of claim 4.

28. The pigment of claim 1 wherein the complex also comprises a water-soluble polymer.

29. The pigment of claim 28 wherein said water-soluble polymer is a modified suspending agent.

30. The pigment of claim 29 wherein said modified suspending agent is a cellulose.

31. The method of claim 21 wherein a water-soluble polymer is also contacted.

32. The method of claim 22 wherein said method further comprises (d) contacting the anion exchange material with a water-soluble polymer.

* * * * *

UNITED STATES PATENT AND TRADEMARK OFFICE
CERTIFICATE OF CORRECTION

PATENT NO. : 4,773,936

DATED : September 27, 1988

INVENTOR(S) : Howard W. Clark and Tracy E. Chapman

It is certified that error appears in the above-identified patent and that said Letters Patent is hereby corrected as shown below:

Column 2, line 3 please delete "pigmetns" and insert -- pigments --.

Column 3, line 35 please delete "Potassium" and insert -- potassium --.

Column 3, line 35 please delete "cummonium" and insert -- ammonium --.

Column 3, line 47 please delete "O" and insert -- Q --.

Column 4, line 21 please delete "postive" and insert -- positive --.

Column 4, line 22 please delete "positive valence of 2; A".

Column 6, line 10 please delete "$Al_{1-x}Ti_xO_y(OH)_z](A^{-1})_d(A^{-2})_e$" and insert -- $[Al_{1-x}Ti_xO_y(OH)_z](A^{-1})_d(A^{-2})_e$ --.

Column 7, line 16 please delete "changeable" and insert -- exchangeable --.

Column 8, line 54 please delete "insoluble" and insert -- soluble --.

Column 9, lines 6 and 7 please delete "contacted with" and insert
-- contacted together, the anionic amphipathic material is contacted with --.

Column 9, line 17 please delete "orresponds" and insert -- corresponds --.

Column 9, line 32 please delete "in batch" and insert -- in a batch --.

Column 10, line 20 please delete "coetrusion" and insert -- coextrusion --.

Column 11, line 26 please delete "preferably" and insert -- preferable --.

UNITED STATES PATENT AND TRADEMARK OFFICE
CERTIFICATE OF CORRECTION

PATENT NO.  : 4,773,936

DATED       : September 27, 1988

INVENTOR(S) : Howard W. Clark and Tracy E. Chapman

It is certified that error appears in the above-identified patent and that said Letters Patent is hereby corrected as shown below:

Column 11, line 31 please delete "needed." and insert -- needed, --.

Column 11, line 33 please delete "substantialy" and insert -- substantial --.

Column 12, lines 7 and 8 please delete "$[MgAl(OH)_4(Cl)$" and insert -- $[MgAl(OH)_4](Cl)$ --.

Column 17, line 3 please delete "mixtures" and insert -- and mixtures --.

Column 18, line 3 please delete "exchnnge" and insert -- exchange --.

Signed and Sealed this

Twenty-second Day of May, 1990

Attest:

HARRY F. MANBECK, JR.

*Attesting Officer*   *Commissioner of Patents and Trademarks*